United States Patent [19]

Greenbaum

[11] 4,107,876
[45] Aug. 22, 1978

[54] INVERTED V CHANNEL CULTURE

[76] Inventor: George Greenbaum, 790 Boylston St., Boston, Mass. 02199

[21] Appl. No.: 881,586

[22] Filed: Feb. 27, 1978

Related U.S. Application Data

[63] Continuation-in-part of Ser. No. 842,292, Oct. 14, 1977, which is a continuation-in-part of Ser. No. 763,821, Jan. 31, 1977, which is a continuation-in-part of Ser. No. 684,465, May 7, 1976, Pat. No. 4,014,135.

[51] Int. Cl.² ............................................. A01G 9/02
[52] U.S. Cl. ........................................... 47/79; 47/85
[58] Field of Search ........................... 47/79, 85–86, 47/66, 59, 62

[56] References Cited

U.S. PATENT DOCUMENTS 4,014,135  3/1977  Greenbaum ............................. 47/86

FOREIGN PATENT DOCUMENTS 467,955  6/1937  United Kingdom ........................ 47/86
668,757  3/1952  United Kingdom ........................ 47/79
737,660  9/1955  United Kingdom ........................ 47/87

Primary Examiner—Robert E. Bagwill
Attorney, Agent, or Firm—Richard L. Stevens

[57] ABSTRACT

A planter having a longitudinal inverted-V floor and inner and outer walls is disclosed. The lower portion of the inner walls are water permeable. The outer walls and lower portion of the floor define a reservoir containing hydrophilic fill. The inner walls and upper portion of the floor define a cavity containing soil. Plates seal the ends of the floor and wals. Water from the fill in the reservoir transfers to the soil in the cavity.

33 Claims, 31 Drawing Figures

U.S. Patent  Aug. 22, 1978  4,107,876
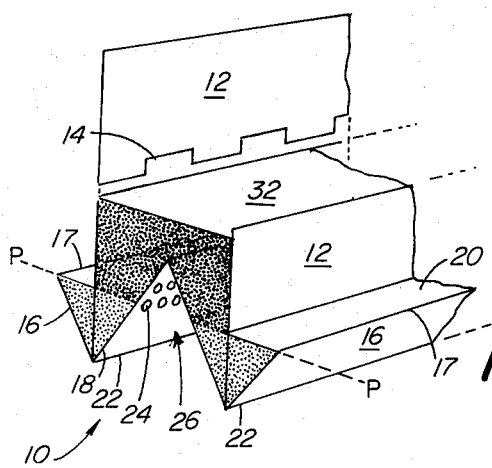
FIG. 1
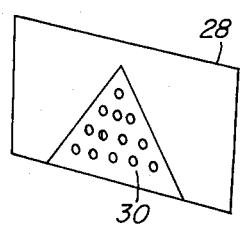
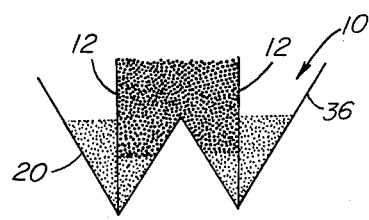
FIG. 2
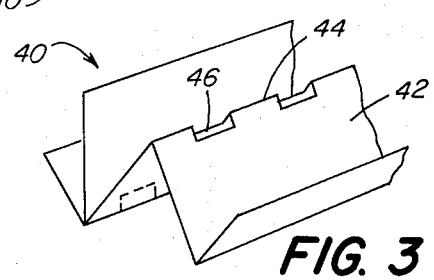
FIG. 3
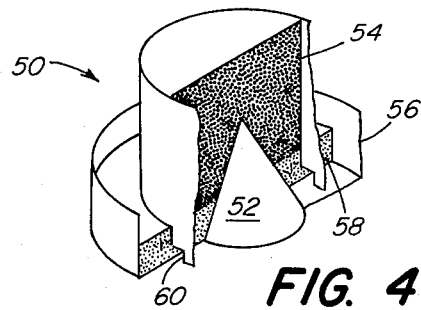
FIG. 4
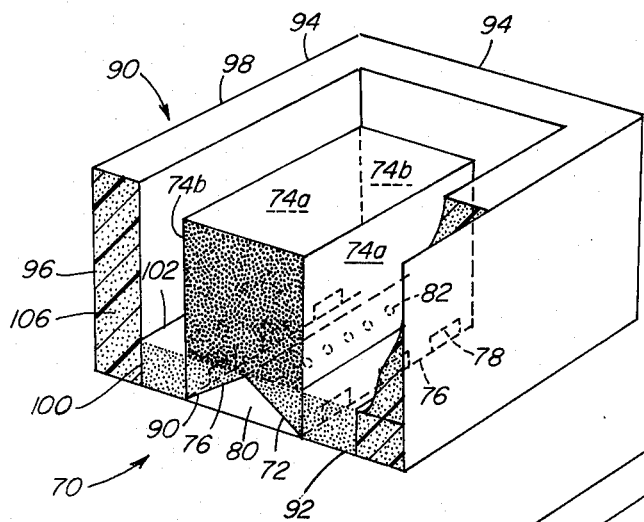
FIG. 5
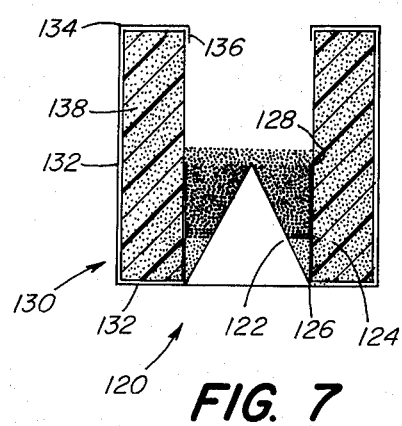
FIG. 7
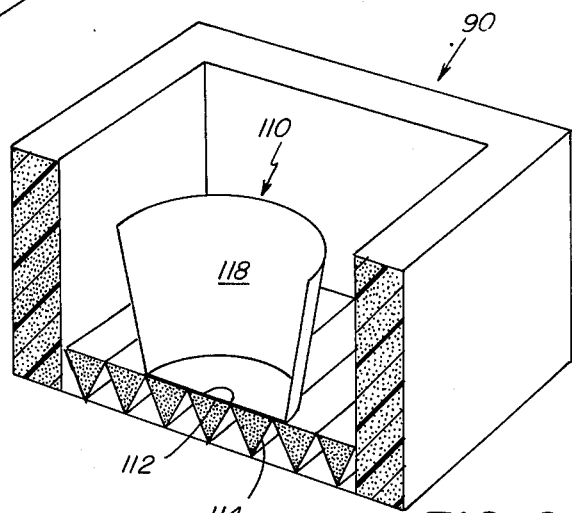
FIG. 6

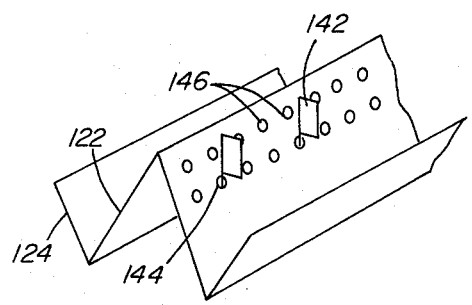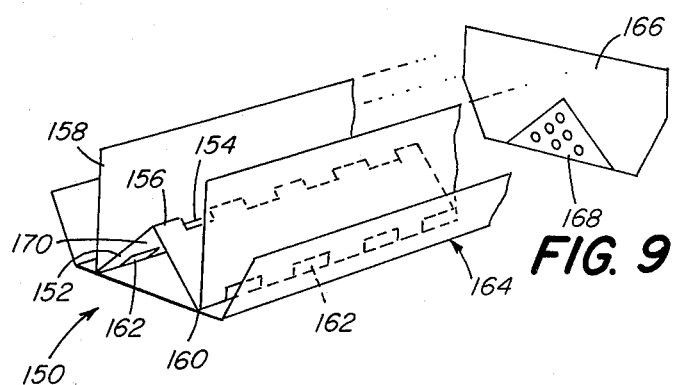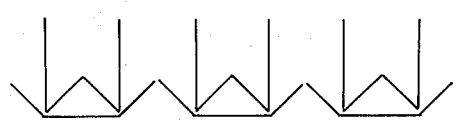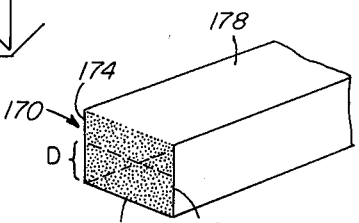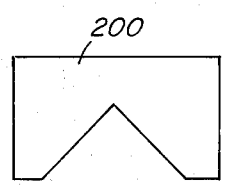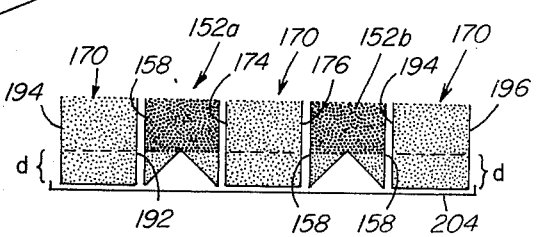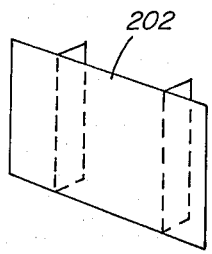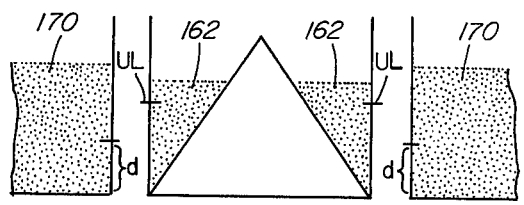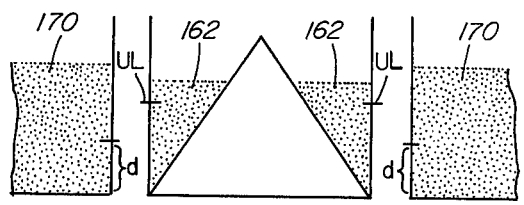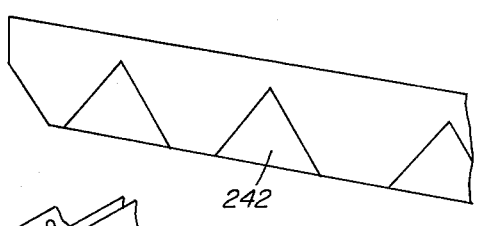

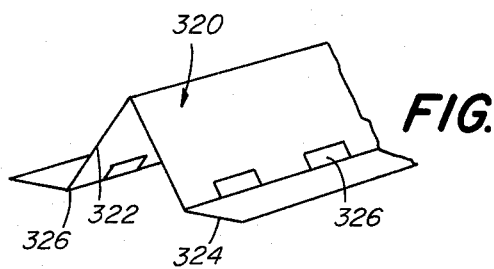
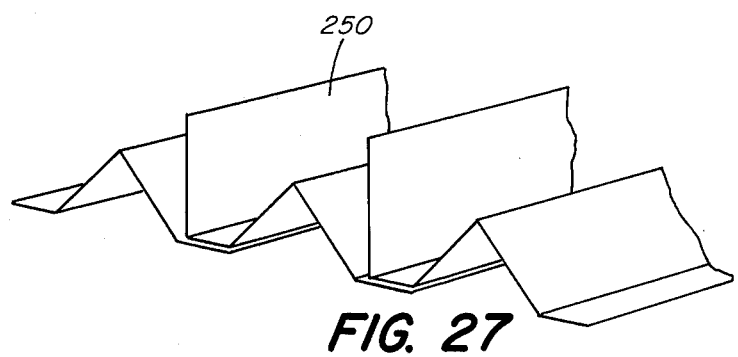
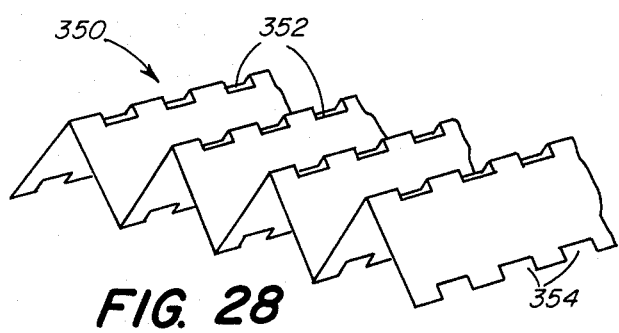
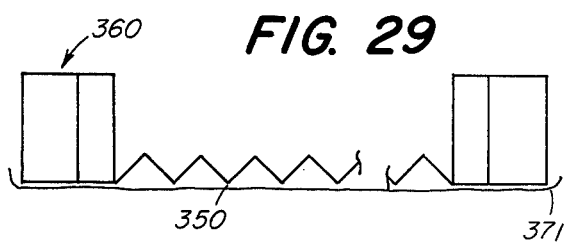
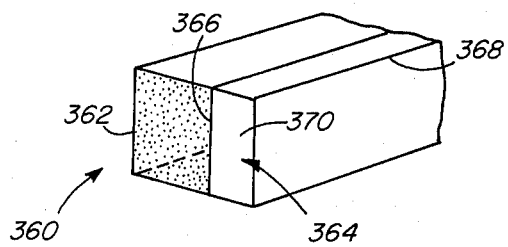
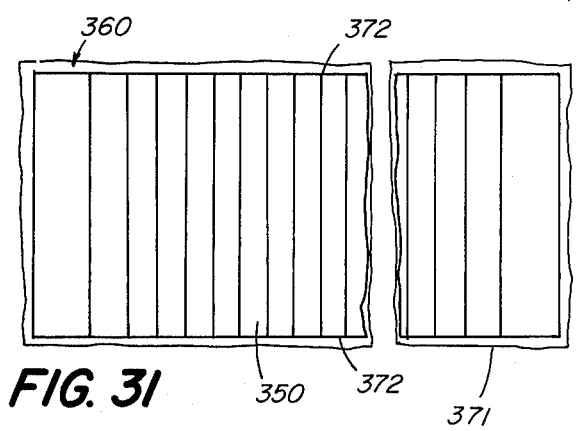

INVERTED V CHANNEL CULTURE

CROSS-REFERENCE TO RELATED APPLICATIONS

This application is a continuation-in-part application of U.S. patent application Ser. No. 842,292 entitled CHANNEL CULTURE ARRAY filed Oct. 14, 1977 which in turn is a continuation-in-part application of U.S. patent application Ser. No. 763,821 filed Jan. 31, 1977 which in turn is a continuation-in-part application Ser. No. 684,465 now U.S. Pat. No. 4,014,135 issued Mar. 29, 1977 and filed May 7, 1976.

BACKGROUND OF THE INVENTION

This invention is directed to a planter which may be used for individual house plants, for channel culture devices, for greenhouses and for large scale farming operations.

Whether plants are grown individually for personal pleasure with little economic gain or on a large scale, maximizing plant growth while minimizing the use of water and plant nutrients is always sought.

In growing different types of plants effectively, the common denominator is root aeration and proper moisture control in the plant support system (soil). To achieve this dual benefit myriad planters and channel culture configurations have been proposed. The following references are illustrative of the prior art directed to these benefits which prior art most closely resembles my invention.

U.S. Pat. No. 4,040,207 discloses a planter having inner and outer walls defining a cavity into which water is introduced and fertilizer is metered into the soil.

U.S. Pat. No. 4,020,596 discloses a planter supported on and spaced apart from a base containing water, the water in contact with the soil in the planter.

U.S. Pat. No. 3,987,584 discloses an apertured dome-shaped chamber extending from the bottom of a planter into the soil in the planter. Excess water accumulates in a tray on which the planter is supported.

British Patent Specification No. 668,757 discloses a V-shaped apertured tray for seedlings.

Both U.S. Pat. No. 3,987,585 and British patent specification No. 737,660 disclose inverted shaped structures to support soil for plant growth.

Common to most of the above patents is the problem that where a plant is overwatered no provision is made to both drain away excess water from the soil and to provide increased aeration of the root system of the plant. Where it would appear in the referencs that excess water would drain away no provision is made for maintaining a separate supply of water which can be automatically metered into the soil from such separate supply.

Accordingly there exists a need for a planter whether for a home or commercial use which would prevent the overwatering of the plants, provide a reservoir of water which would automatically meter water into the soil without the soil actually contacting the standing water, provide enhanced root aeration and lastly provide for increased humidification of the microenvironment about the plant itself.

SUMMARY OF THE INVENTION

My invention is broadly directed to a planter which comprises an inverted substantially V-shaped floor having lower edges and an upper ridge. Inner and outer walls are joined to the lower edges, the inner walls defining in combination with at least a portion of the floor a cavity in which soil is placed and the outer walls defining in combination with at least a portion of the floor a reservoir, the floor also defines a tunnel for fluid flow. The lower portion of the inner walls is fluid permeable.

A hydrophilic material (fill) such as peat; sand; bark granules; polymeric felts including nylon, polyester (referred to as capillary carpets); open cell foams of synthetics such as polystyrene and polyethylene; fiberglass; rock wool; etc., is placed in the reservoir at least between the inner and outer walls. The reservoir is in fluid flow communication with the cavity whereby the liquid in the reservoir flows from the reservoir into the solid in the cavity.

The planter may be longitudinal or in a closed loop such as a circle (where the floor would be a cone). The floor between the inner walls may have one or a plurality of inverted V's. The floor may be fluid permeable over its entire surface or only over a portion thereof.

Where the planter is longitudinal, end plates or caps close the ends of the planter and preferably are fluid impermeable except for that portion which is in line with the tunnel defined by the floor.

The invention includes several aspects. In one embodiment the planter comprises a longitudinal inverted V floor, an outer wall sealingly joined to the lower edge of the floor and inner walls adjacent the lower edge of the floor. The lower edge of the inner wall is fluid permeable. Fill is placed in the planter between the lower portion of the floor and the outer wall. Soil is placed on the fill, and over the upper portion of the floor and between the inner walls. The fluid permeable portion of the inner walls is below the soil. In one aspect of this embodiment the upper edges of the outer walls are above the liquid permeable portion of the inner walls. These upper edges lie in an imaginary plane P-P which defines the height of the reservoir and the depth of the soil in the cavity.

In a further embodiment of the invention, the floor is a cone and the inner and outer walls are concentrically joined to the base of the cone.

In a further embodiment the planter is combined with a dimensionally stable hydrophilic fill which defines in part the cavity.

In a still further embodiment of my invention, preferably where two or more longitudinal inverted V floors are used, a service channel or reservoir channel (as disclosed in my aforementioned applications) forms both the inner and outer walls which are common to the floors which they lie between. In this embodiment the floor and channels may be extended longitudinally and laterally with alternating service and reservoir channels in any combination and in any direction.

In a still further embodiment, the floor comprises a plurality of longitudinal inverted V floors arranged in side-by-side relationship with exterior channels, as described in may aforementioned application functioning as inner and outer walls.

BRIEF DESCRIPTION OF THE DRAWINGS

FIG. 1 is a perspective telescopic view of a planter embodying my invention;

FIG. 2 is a front elevation of an alternative embodiment of the invention shown in FIG. 1;

FIG. 3 is an alternative embodiment of FIG. 1 having slots in the ridge of the triangulated floor and bottom edge slots;

FIG. 4 is a perspective view of a planter in a circular configuration;

FIG. 5 is a perspective view of a planter in a rectangular configuration;

FIG. 6 is a perspective view of an alternative embodiment of FIG. 5;

FIG. 7 is a front view of a planter with inner walls partly formed of fill material;

FIG. 8 is a perspective view of the floors and inner walls of FIG. 7;

FIG. 9 is a perspective view of a planter with a reservoir boot;

FIG. 10 is a front view of a plurality of planters of FIG. 9;

FIG. 11 is a perspective view of a reservoir channel;

FIG. 12 is a perspective view of a service channel;

FIG. 13 is a front view of an embodiment of my invention in combination with alternating reservoir and service channels;

FIG. 14 is a front view of an end cap;

FIG. 15 is a perspective view of the end cap of FIG. 14;

FIG. 16 is a front view of an alternative embodiment of FIG. 13;

FIG. 17 is a perspective view of inner walls adjoined to floors by a horizontal foot portion;

FIG. 26 is a perspective view of the planter of FIG. 17;

FIG. 27 is a perspective view of a plurality of planters of FIG. 26 with vertical walls;

FIG. 28 is a perspective view of a planter of my invention where the floor comprises a plurality of inverted V's;

FIG. 29 is a front view of the floor of FIG. 28 with exterior channels;

FIG. 30 is a perspective view of an exterior channel; and,

FIG. 31 is a plan view of the floor of FIG. 28 with the exterior channels of FIG. 30.

DESCRIPTION OF THE PREFERRED EMBODIMENTS

Figure 18:
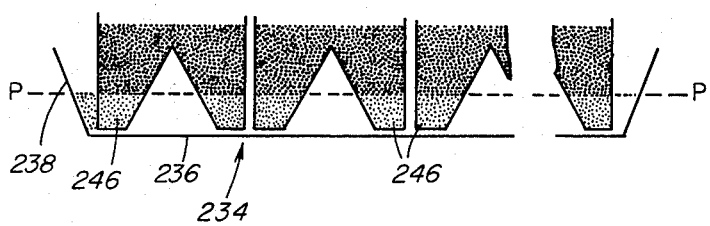
FIG. 18 is a front view of the embodiment of FIG. 17.

Referring to FIG. 1, the invention is embodied in a planter 10 shown in telescopic prespective. The planter 10 comprises inner walls 12, the lower portion thereof being apertured at 14; outer walls 16; and an inverted V-shaped floor 18. The lower portion of the floor 18 (upper surfaces) and the outer walls 16 define a reservoir in which is placed a hydrophilic fill 20 such as peat. An imaginary plane P—P passes across upper edges 17 of the walls 16. The floor 18 and walls 16 are formed integrally from a liquid impermeable material and are sealingly joined at fold line 22.

The floor 18 is apertured at 24 above the plane P—P. The lower (under) surfaces for the floor 18 define a tunnel 26. End plates 28 (only one shown) are sealed at either end of the planter 10 to the outer edges of the floor 18 and walls 16. The plates 28 are apertured at 30 which apertures register with the ends of the tunnel 26. The apertures render the upper portion of the floor 18 fluid permeable.

The inner walls 12 are received on the fold line 22. The apertures 14 are below the plane P—P. The floor 18, walls 12 and plates 28 define a cavity for soil 32.

The fill 20 is placed in the planter 10 up to the level of the plane P—P. Soil 32 is placed over the fill 20 on the floor 18 between the walls 12 above the plane P—P. When assembled, as shown in FIG. 1, and if watering the plant (soil) directly, the inverted V floor 18 allows water to pass both through the apertures 24 and into the fill 20. Overwatering will result in the fill being saturated via slots 14 and then overflowing edges 17 prevent the soil from standing in water. As the soil 32 tends to dry, liquid from the fill 20 will transfer to the soil 32. After the plant has been watered then air may pass through the apertures 24 via apertures 30.

In this preferred embodiment, apertures 24 are shown. Depending upon the soil system employed and the type of plant being grown, the portion of the floor above the plane P—P may simply be fluid permeable and not specifically apertured with apertures of a specific structural dimension. Also it may be possible that a portion of the floor above the plane P—P as with the remainder of the floor and outer walls 14 may be fluid impermeable. In this situation it would be considered that enough aeration for the roots would be provided by the air flow through the fill on which the soil rests.

The four advantages outlined above achieved with this configuration. When watering the plant, if the user continues to water, then the soil will first become completely moistened but the water will continue to flow through the fill and eventually over the upper edge of the outer wall 16. In this way, regardless of how much the plant is overwatered in a particular situation, by having the soil above the plane P—P, which is co-extensive with the upper edges of the outer walls 16, the additional water will simply run over the outer edge. After watering when the soil tends to 'dry-out' in reference to the fill 20, then the water contained in the fill material will be transferred in two ways; first, into the soil 32 maintaining the soil in a moist condition; and, secondly, into the immediately (micro) atmosphere about the planter from the fill 20 between the walls 12 and 16, providing increased humidification for the plant. Further, because of the nature of the fill, particularly the one described, namely P-gravel, the interstices between the particles will allow for the flow of air through the fill and into the soil 30. In the preferred embodiment the apertures 24 of course allow additional aeration.

In some situations where the problem of overwatering is not acute, such as with an experienced horticulturalist, but the advantages of self-feeding and enhanced humidification are more desirable, the outer walls 16 of the embodiment of FIG. 1 may be extended upwardly and outwardly to provide for an increased reservoir of water and enhanced humidification in the atmosphere about the plant.

As shown in FIG. 2, extended outer walls 36 increase the capacity of the planter 10 to hold fill 20.

In FIG. 3 a perspective partly broken away view of a planter 40 is shown having an inverted V floor 42. Along the ridge 44 of the floor 42 are a plurality of slots 46 to enhance the aeration of the soil disposed on the fill material (not shown).

In FIG. 4 a non-linear (or non-elongate) embodiment of my invention is shown. A planter 50 comprises a cone-like floor 52, and, inner and outer concentric walls 54 and 56, respectively, spaced apart from one another. The outer wall 56 is joined to the lower edge of the cone 52, by a floor 58 and the inner wall 54 is received on the floor 58. The outer wall 56, floor 58 and lower cone surface define the reservoir which holds the fill 20. The upper cone surface and inner wall 54 define the cavity to hold the soil 32. Slots 60 in the lower portion of the wall 54 allow for the fluid transfer between the reservoir and the cavity.

In FIG. 5 an embodiment of a rectangular planter (front wall not shown), particularly adapted for home use and increased humidification about the plant, is shown.

The planter 70 comprises an inverted V floor 72 adjoined to two opposed sets of inner walls 74a and 74b at fold lines 76. Metering slots 78 are formed at the fold lines 76 in the walls 74a. The lower surfaces of the floor 72 define a tunnel and the walls 74b have openings 80 therein in register with the tunnel. The upper portion of the floor 72 is apertured at 82. Fill material 20 is placed on the floor 72 and between the walls 74 as shown and soil 32 is placed on top of the fill as previously described.

The planter 70 is placed in a rectangular outer wall assembly 90 having a floor 92 and four walls 94 (front wall not shown). The walls 94 include an outer side 96 with an upper edge 98, and an inner side 100 with an upper edge 102, the sides forming a chamber therebetween. The sides are sealed to the floor 92. A dimensionally stable fill material 106, such as block, open cell polystyrene foam, is placed on the chambers 104 extending to the upper edges 98. In this embodiment water is introduced separately into the chamber 104 and onto the floor 92 of the outer wall assembly 90 to wet the fill material in the planter. In this way the water level of both the chamber 104 and the water to be metered into the soil 32 can be controlled separately. If desired, the lower portion of the inner sides 100 of the chambers may be made fluid permeable. With the edge 98 higher than the edge 102, an increased surface area for humidification is provided.

In FIG. 6 a further embodiment of the planter concept of FIG. 5 is shown wherein the outer wall assembly 90 is the same as for FIG. 5; that is, forming a separate humidification ring or chamber for the plant. A pot 110 having at least one aperture 112 therein is placed on an inverted V cleat 114. The planter is filled with hydrophilic fill 20 and soil 32.

In FIG. 7, an elongated planter 120 is shown having a floor 122 and inner walls 124 joined to the floor at fold lines 126. The inner walls have upper edges 128. A U-shaped longitudinal channel 130 has a base 132 and upwardly extending outer walls 132, under edges 134, terminating in retaining lips 136. A fill material 138, such as block, open cell polystyrene is received between the inner and outer walls 124 and 132. The soil 32 extends beyond the upper edges of the inner walls 124. A portion of the material 138 above the edge 128 defines in part the planter cavity and directly engages the soil 32. This provides for lateral introduction of air and water into the root system. If desired, the walls 134 can be solely planar with the lip 136 eliminated. The walls 132 are of course impermeable to prevent loss of water outwardly from the soil and fill. Suitable end plates or caps (not shown) are used to seal the ends of the planter 120. Such end plates as heretofore described seal the ends of the elongated planter. However, the plates are apertured to allow air to pass through that portion of the end plates in register or in line with the tunnel defined by the inverted V floor.

The air and water flowing into the soil 32 can advantageously be controlled by the use of baffles 140 placed on the floor 122 as illustrated in FIG. 8. The baffles are formed in a flag-like configuration having a baffle plate 142 secured to a projection 144. The projections are inserted into the floor apertures 146 and form desirable air and water flow patterns.

In FIG. 9 a further alternative embodiment of the planter is shown at 150 and comprises an inverted V-shaped floor 152 having a plurality of slots 154 along its upper ridge 156. The walls of the floor 152 extend downwardly and then turn upwardly to form inner walls 158 joined along fold line 160. The fold line is characterized by a plurality of slots 162. The planter 150 is received in a U-shaped trough or reservoir boot 164. The ends of the planter 150 and the trough 164 lie in the same plane and are sealed with an end cap 166. As with the end caps of FIG. 1, the end caps 166 are formed with apertures 168 which align generally with a tunnel 170 of the inverted V floor 152.

In FIG. 10, a plurality of planters 150 such as shown in FIG. 9 are aligned in side-by-side relationship. This is to illustrate their appearance as they would be used in a greenhouse or commercial operation.

My basic inventive planter concept may be used as a growing channel in combination with service channels (such as corresponds to 34 of FIG. 6, Ser. No. 763,821) or reservoir channels (such as corresponds to 10 of FIG. 1, Serial No. 842,292). The use of my invention in combination with the channel culture concept is illustrated in FIGS. 11, 12, 13, 14, 15 and 16. In this embodiment, reservoir channels are indicated generally at 170 and service channels indicated at 190. Basically, these channels 170 and 190 form common outer walls for two alternate floors 152. More specificially the floor 152 with inner walls 158 and slots 162 are used with reservoir and/or service channels.

Referring to FIG. 11, a reservoir channel 170 is shown. The channel comprises an impermeable floor 172, and walls 174 and 176 containing a fill material 178 such as used in the preferred embodiment. As described in the parent application, the reservoir channel 170 is filled with water and the walls 174 and 176 are impermeable up to the level d.

Referring to FIG. 12, the service channel 190 comprises an impermeable floor 192, permeable walls 194 and 196, and a fill material 178 such as used in FIG. 11. Detailed descriptions of both reservoir channels and service channels are set forth in detail in my parent and grandparent applications respectively.

In FIG. 13, the floors 152 have their inner walls 156 extending vertically upward such that they will abut the vertical walls of the adjacent service and/or reservovir channels 190 and 170, respectively. In all other respects the structural features of the floors 152 are the same including the ridge slots 154 and the lower slots 162 formed at the fold line 160. The slots 162 are formed such that their upper edge is above the upper limit d of the nonpermeable portion of the reservoir channel 170.

Thus, when the inner wall 158 is abutted to a reservoir channel such as 170, the upper edge UL of the slot 160 being above the uppermost limit defined by d, insures transfer of the liquid from the reservoir channel 170 into the planter 150.

The total assembly includes suitable end plates 200 for the planter 150 and end caps 202 for the channels 170 and 190 as shown in FIGS. 14 and 15. With the end plates and caps sealingly secured, the entire assembly is placed on an impermeable sheet 204 such as polyethylene. The purpose of the sheeting 204 is to prevent inadvertent loss of water to the ground, it being understood that where assembled and sealed with the appropriate end caps and plates, fluid flow is lateral among the channels.

In this embodiment a channel functions as both an inner and outer wall. In FIG. 13 the wall 196 is one outer wall for the floor 152b (the other being 174) and defines with the floor (and end plate and cap) a reservoir for the fill. The inner walls now comprise both walls 158 and 194 (the other being 158 and 176).

In FIG. 16, the planter 150 is shown with fill in the lower portion thereof abutting the reservoir channels 170 up to the level d. The upper limit of the slot 162, identified as UL, is above the upper limit of the slot 162 to ensure liquid transfer.

As described in my parent applications, these channels and planters may be extended longitudinally and laterally in any desired combination.

Depending upon the type of plants growing and the environment, i.e., greenhouse, outdoors, indoors, etc., any combination of the foregoing may be used. That is, combinations such as reservoir channel-planter-reservoir channel-planter, etc.; service channel-planter-service channel-planter, etc.; reservoir channel-planter-service channel-planter, etc.; or any combination of the foregoing may be used. Further the vertical walls of the reservoir and service channels may define a plane P—P which is at the lower limit of the soil in the planter 52 or above the limit of the soil functioning in a similar manner as the walls 16 of the planter described in FIG. 1.

As described for FIGS. 1 and 2, the inverted V floor of the planter may be liquid permeable over at least a portion of all of its entire surface as desired.

A still further embodiment of my basic concept is embodied in FIG. 17 where a planter 220 adapted for large scale agricultural use is shown. The planter 220 comprises a floor 222 and inner walls 224 integrally joined to the floor by horizontally extending feet 226 to form a floor assembly 228. The assembly includes water metering slots 230 formed in the lower portions of the inner walls 224.

The upper portions of the floors 222 are apertured at 232 for fluid flow therethrough. The assemblies 228 are arranged in side-by-side parallel relationship and are received in a boot reservoir 234. The boot reservoir 234 comprises a floor 236, walls 238, and end plates 240 (only the rear end plate is shown in telescopic perspective). The plate 240 has apertures 242 which register with tunnels 244 defined by the lower surfaces of the floor 222. When assembled the plates 240 are secured to ends of the floor 222 and the walls 238.

FIG. 18 is a front view of FIG. 17. As can be clearly understood, the walls 238 of the bottom 234 form the outer walls with which the floor 236, end plates 240 and the lower portions of the assemblies 228 define the reservoir. The hydrophilic fill 246 in this embodiment, is open cell foam which defines the upper limit of the reservoir at the imaginary plane P—P. As before soil 32 is placed over the inverted V floor 222. The space between the outer walls 238 and adjacent inner walls 224 may or may not be filled with a hydrophilic fill such as the material 246. The assemblies 228, comprising the inverted V floors and associated inner walls define a plurality of individual cavities disposed within the outer walls 238 to contain the soil.

Figure 19:
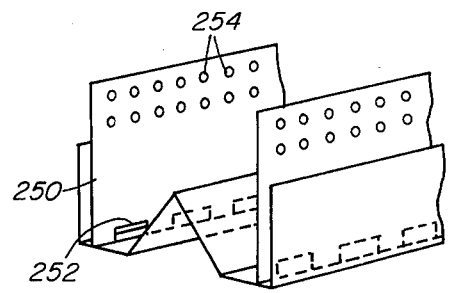
FIG. 19 is a perspective view of the planter of FIG. 17 with vertical walls.

Referring to FIG. 19, the height of the cavity containing the soil 32 can be increased by the use of inner vertical walls 250 having water metering slots 252 formed in their lower edges, and further being apertured at 254 throughout the upper portions thereof. When inserted as shown in FIG. 19, the slots 252 are in register with the water metering slots 230 of the assembly 228.

Figure 20:
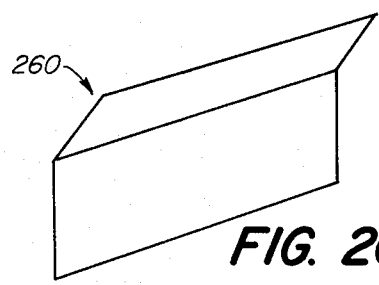
FIG. 20 is a perspective view of fill used in the planter of FIG. 17.

An angular wall 260 as illustrated in FIG. 20 can be used in lieu of the wall 250 to control the flow of rain water.

Figure 21:
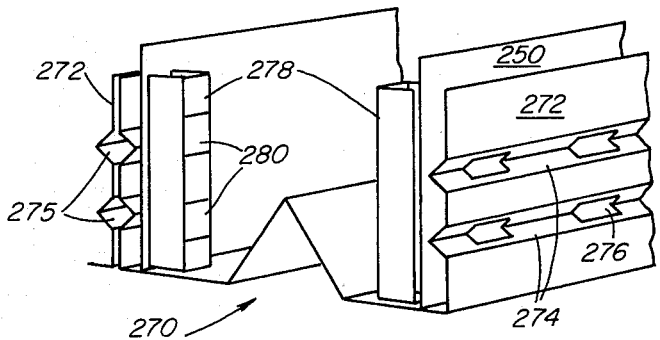
FIG. 21 is a persepctive view of a modified planter of FIG. 17 with vertical walls in braces.

In FIG. 21 a modified form of the planter of FIG. 17 is shown at 270. The planter 270 differs from the planter of FIG. 17 in that inner walls 272 have a plurality of longitude ridges 274 defining air ducts 275. These ridges 274 are slotted at 276. Vertical walls 250 are placed adjacent the inner walls 272 abutting the inwardly extending ridges 274. Adjacent the inner walls 272 are vertical U-shaped braces 278. The braces 278 are characterized by slots 280 which face the fill and soil. End plates (FIG. 22b) for this embodiment are shaped to register with the air ducts 275. When assembled, air may flow into the ducts 275 through the walls 250, the slots 280 in the braces 278 and into the adjacent fill and soil.

The braces 278 may also be employed with the planter of FIG. 17.

Figure 22A:
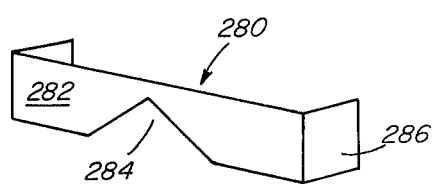
FIG. 22 is a perspective view of an end cap used with FIG. 17.
Figure 22B:
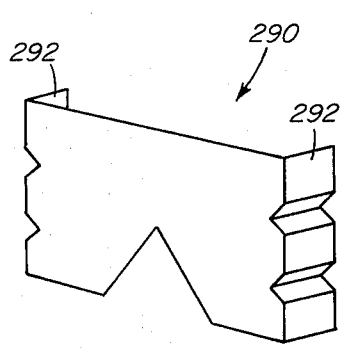

In lieu of the plates 240, described for FIG. 17, individual end caps 280 and 290 such as shown in FIGS. 22a and 22b, may be used. An end cap 280, such as would be used for enclosing one end of a single assembly 228, is shown in FIG. 21a and comprises a wall 282 with an aperture 284 to register with the tunnel formed by the lower surfaces of the inverted V floor. Inwardly extending flages 286 are adapted to receive the inner walls 224. The end caps 290 for the planter 270 have flanges 292 recessed to mate with the ridges 274. When end caps such as 280 and 290 are used they are sealingly secured side-by-side and to the edges of the planter which they engage.

Figure 23:
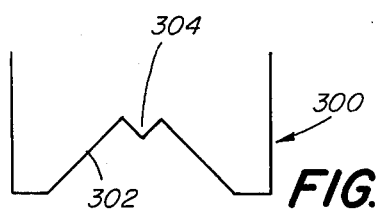
FIG. 23 is a front view of a modified planter of FIG. 17.
Figure 24:
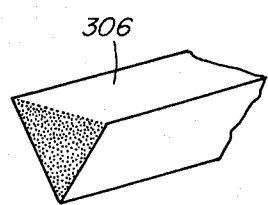
FIGS. 24 and 25 are perspective views of the channels used with the planter of FIG. 22.
Figure 25:
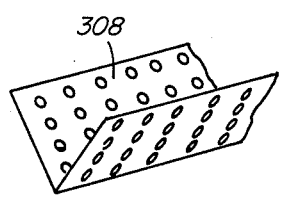

Another modified embodiment of the planter of FIG. 17 is shown in FIG. 23 wherein the upper portion of an inverted V floor 302 of a floor assembly 300 is recessed at 304 to accommodate V-shaped channels 306 or 308 as shown in FIGS. 24 and 25. The channel 306 is adapted to contain hydrophilic fill to enhance the humidification about an adjacent plant and the channel 308 may contain separate plants such as marigolds, legumes, etc., grown to enhance the growth of an adjacent plant.

In FIGS. 26 and 27 another modified arrangement of the planter of FIG. 17 is shown, wherein a floor assembly 320 is illustrated. The assembly 320 comprises an inverted apertured V floor 322, laterally extending feet 324 and water metering slots 326. Vertical walls 250 of FIG. 19 function as inner walls. The feet 324 extend from the lower edge of the floor 322 and are joined to the floor 322 at fold line 326.

In FIG. 27 the assemblies 320 are shown side-by-side with adjacent feet 324 overlapping to provide stability, with the walls 250 received thereon. The assembly is adapted to be received in a reservoir boot as shown in FIG. 17 and appropriate end plates or end caps are used to complete the planter.

In a still further aspect of my invention, a pleated bottom floor 350 is illustrated in FIG. 28. This floor 350 is similar to the construction of the floor of the planter described for FIG. 9 without the inner walls. It comprises ridge slots 352 and lower edge slots 354.

FIG. 29 illustrates the use of the bottom floor 350 in combination with exterior channels 360 as described in my parent application. The exterior channel 360 is shown in greater detail in FIG. 30 and comprises an inner wall 362 and an outer wall 364. The outer wall 364 comprises an inner surface 366 and an outer surface 368 which defines a pneumatic chamber 370. Fill material 20 is disposed between the inner surface 366 and the inner wall 362, as described in the aforementioned application.

FIG. 31 is a plan view of the bottom floor 350 on a sheet of fluid impermeable polyethylene 371. Two ends of the floor 350 comprise exterior channels 360 as shown in FIG. 29. The other ends are closed by suitable end plates 372 which function as previously described end plates, i.e., sealing the ends while allowing fluid through the tunnels.

The lower portion of the wall 362 is fluid permeable whereby the wall 362 functions as the wall 12 in FIG. 1, and the wall 364 is fluid impermeable and functions as the wall 16 of FIG. 1 (or 36 of FIG. 2).

What I claim is:

1. A planter for growing plants which comprises:
   an inverted V-shaped floor having lower edges and an upper surface and a lower surface;
   outer walls on either side of the floor combined to the lower edges and defining a reservoir therebetween at least a portion thereof adapted to hold a hydrophilic fill material;
   inner walls having lower portions and upper portions, said lower portions received in the reservoir between the outer walls and floor and being fluid permeable, the upper portions defining with the floor a cavity to hold soil, the cavity and reservoir in fluid flow communication whereby when liquid is added to the soil, the configuration of the V-shaped floor will enhance the drainage through the lower portion of the inner wall, said liquid being absorbed by the hydrophilic fill, which fill will tend to transmit the liquid back to the soil as the soil loses its moisture.

2. The planter of claim 1 wherein the planter is elongated and which includes:
   means to seal the ends of the planter.

3. The planter of claim 2 wherein the lower surfaces of the floor define a tunnel and an upper portion of the floor is apertured and the means to seal the ends includes apertures, which apertures align with the tunnel to enhance the flow of air through the tunnel and into the soil.

4. The planter of claim 1 wherein at least a portion of the floor is fluid permeable.

5. The planter of claim 1 wherein the outer walls include upper edges, said upper edges lying in a plane below the upper edges of the inner walls and forming the upper limit of the reservoir, the upper edges of the outer walls defining an imaginary plane P—P below which soil in the cavity is not placed whereby the soil in the cavity when liquid is introduced thereto will not be allowed to remain standing in accumulating water, said water flowing over the upper edges of the outer walls.

6. The planter of claim 1 wherein the lower portions of the inner walls include a plurality of slots.

7. The planter of claim 1 wherein the lower edges of the floor are sealingly joined to the lower edges of the outer wall at a fold line.

8. The planter of claim 1 wherein the outer wall comprises first and second sides defining a humidification chamber therebetween, the inner side spaced apart from the inner wall.

9. The planter of claim 8 wherein the inner wall is circular.

10. The planter of claim 8 wherein the upper edge of the inner side is lower than the upper edge of the outer side and a dimensionally stable fill is received, the rim extending above the edge of the inner side whereby the available surface area of the hydrophilic fill is disposed in the chamber.

11. The planter of claim 10 wherein the hydrophilic fill is an open cell polymeric material.

12. The planter of claim 11 wherein the planter is substantially rectangular in shape and the inner walls are joined to the lower edges of the inverted floor at a fold line and wherein said fold line is characterized by a plurality of metering slots therein and further wherein at least two opposed walls of the planter include vents therein which vents are located above the metering slots, said vents in combination with apertures formed in the upper portion of the floor of the planter providing for the passage of air therethrough.

13. The planter of claim 12 which includes means to provide fluid flow communication between the humidification chamber and the cavity within the planter.

14. The planter of claim 1 wherein the upper edge of the inner wall lies in a plane below the upper edge of the outer wall, hydrophilic fill is disposed between the inner and outer walls and above the upper edge of the inner wall, said fill defining in part the planter cavity.

15. The planter of claim 14 wherein said fill is dimensionally stable polymeric open cell foam material.

16. The planter of claim 1 which includes means to control the flow of air and water through the hydrophilic fill disposed between the inner walls.

17. The planter of claim 16 wherein said means includes flag-like baffles secured to the floor of the planter.

18. The planter of claim 1 wherein the planter is elongated and the inner walls are joined to the lower edges of the floor at fold lines, the upper portion of the floor being fluid permeable, the lower surfaces of the floor defining a tunnel;
   the planter further comprising a U-shaped reservoir boot having a bottom and opposed sides, the floor and inner walls adapted to be received in the trough and the sides of the U-shaped trough forming the outer walls; and
   means to seal the ends of the planter, said means being fluid permeable where in register with the tunnel.

19. The planter of claim 1 wherein the planter is elongated and the upper portion of the floor is fluid permeable, the lower surfaces of the floor defining a tunnel, and wherein the inner walls are joined to the lower edges of the floor at fold lines;
   further wherein at least one outer wall includes a service channel, said service channel having opposed sides and a floor and being formed in a substantially U-shaped configuration, one of said sides adjacent the inner wall, the other of said sides spaced apart from the inner wall, the service channel adapted to be filled with a hydrophilic fill and in fluid transfer communication with the cavity in the planter; and, means to seal the ends of the planter, said means fluid permeable where in register with the tunnel.

20. The planter of claim 19 which includes a plurality of planters and service channel outer walls arranged in side-by-side alternating parallel relationship.

21. The planter of claim 20 wherein the inner walls are joined to the lower edges of the floor at fold lines and at least one outer wall comprises a reservoir, the reservoir channel including a floor and two opposed sides formed in a substantially U-shaped configuration, the lower portions of the sides and the floor of the reservoir channel being fluid impermeable, one side adjacent the inner wall, the other side spaced apart from the inner wall, the fluid impermeable portion of the inner wall of the planter being above the impermeable upper portion of the sides of the reservoir whereby the reservoir channel is in fluid flow communication with the cavity of the planter.

22. The planter of claim 21 which includes a plurality of planters and reservoir channel outer walls arranged in side-by-side alternating parallel relationship.

23. The planter of claim 21 wherein the other of said outer walls is a service channel, said service channel having opposed sides and a floor and being formed in a substantially U-shaped configuration, one of said sides being adjacent the inner wall of the planter, the other side spaced apart from the inner wall, the service channel adapted to be filled with a hydrophilic fill and in fluid transfer communication with the cavity in the planter.

24. The planter of claim 23 which includes a plurality of planters having inner walls and outer walls comprising both reservoir channels and service channels arranged in alternating side-by-side parallel relationship.

25. The planter of claim 1 wherein the planter is elongated, the lower surfaces of the floor define a tunnel, the inverted V floor comprises a plurality of floors, each floor with an associated pair of inner walls forming a floor assembly, said assemblies arranged in side-by-side relationship between said outer walls, said assemblies further comprising a substantially horizontal planar portion joined to the lower edge of the floor and the lower edge of the wall, the inner walls of each assembly having a plurality of metering slots formed therein and the upper portions of the inverted V floors being fluid permeable;

wherein the outer walls are joined to a bottom to form a reservoir boot; and, means to seal the ends of the planter, said means being fluid permeable where in register with the tunnel.

26. The planter of claim 25 wherein the means to seal the ends of the planter is sealingly secured both to the ends of the assemblies and the bottom and outer walls; and, said means further including apertures therein which will provide for fluid flow through the tunnels defined by the inverted floors, said apertures having a lower limit disposed above the upper limit of the standing water in the reservoir.

27. The planter of claim 26 which includes at least one vertical wall disposed adjacent one of the inner walls associated with each of the floor assemblies; said vertical walls having slots formed in the lower portion thereof which slots, when the vertical wall is in place, are in register with the slots of the floor assembly; the vertical walls further being fluid permeable through the upper portions thereof.

28. The planter of claim 27 which includes means to brace the vertical walls when said walls are received in the floor assembly.

29. The planter of claim 28 wherein the inner walls are grooved and have a plurality of slots formed in said grooves and the means to brace the walls include flow passages therein in register with the fluid permeable portions of the vertical walls and the slots formed in the grooves whereby air flow through the soil disposed in the cavity is enhanced.

30. The planter of claim 25 wherein the inverted V floor of the floor assembly is recessed at the upper portion thereof and further includes a V-shaped channel adapted to be seated with said recessed portion whereby hydrophilic fill material may be used to increase the humidification of the plant or alternatively soil may be placed in said channel to enhance the growth of the adjoining plant.

31. The planter of claim 1 wherein the planter is elongated, the lower surfaces of the floor defining a tunnel, the upper portions of the floor being fluid permeable, the inverted V floor comprising a plurality of floors each floor comprising a substantially horizontal planar portion joined to the lower edge of the floor at a fold line forming horizontal foot portions, slots being formed in the lower portions of the floors, the floors arranged in side-by-side relationship, the foot portion of a first floor overlapping the adjacent foot portion of a second floor, the upper portions of the inverted V floors being fluid permeable;

vertical inner walls received between adjacent floors, the lower portion thereof being fluid permeable; and means to seal the ends of a planter, said means being fluid permeable where in register with the tunnel of the inverted floors.

32. The planter of claim 1 wherein the floor comprises a plurality of elongated inverted V floors aligned in side-by-side parallel relationship, the lower surfaces of the inverted floors defining tunnels, the inner walls and outer walls comprising an exterior channel, said exterior channel having an inner wall which is the inner wall of the planter and an exterior wall joined to the inner wall by a floor, the exterior wall forming the exterior wall of the planter and comprising an inner surface and an outer surface, the inner and outer surfaces defining therebetween a pneumatic chamber, the inner and outer walls defining a chamber, said channel in fluid flow communication with the cavity of the planter; and, means to seal the ends of the planter, said means being fluid permeable when in register with the tunnels.

33. The planter of claim 32 wherein the exterior channels define a portion of a perimeter and the floor and exterior channels are disposed on an impermeable surface and sealingly secured thereto.

* * * * *

UNITED STATES PATENT AND TRADEMARK OFFICE
CERTIFICATE OF CORRECTION

PATENT NO. : 4,107,876
DATED : August 22, 1978
INVENTOR(S) : George Greenbaum

It is certified that error appears in the above—identified patent and that said Letters Patent are hereby corrected as shown below:

Abstract - line 7 "wals" should be -- walls --

Column 2, line 17,

"solid" should be -- soil --

Column 2, line 61,

"may" should be -- my --

Column 3, line 36,

"persepctive" should be -- perspective --

Column 4, line 38, after "above" insert -- are --

UNITED STATES PATENT AND TRADEMARK OFFICE
CERTIFICATE OF CORRECTION

PATENT NO. : 4,107,876
DATED : August 22, 1978
INVENTOR(S) : George Greenbaum

It is certified that error appears in the above-identified patent and that said Letters Patent are hereby corrected as shown below:

Column 6, line 65,

"reserovir" should be -- reservoir --

Signed and Sealed this

Tenth Day of April 1979

[SEAL]

Attest:

RUTH C. MASON
Attesting Officer

DONALD W. BANNER
Commissioner of Patents and Trademarks